Patented Jan. 11, 1938

2,104,757

UNITED STATES PATENT OFFICE 2,104,757

INSECTICIDE SPRAY

Walter C. O'Kane, Durham, N. H.

No Drawing. Application May 31, 1934,
Serial No. 728,407

10 Claims. (Cl. 167—43)

This invention relates to a new spray material for control of insects, and more particularly is concerned with such spray materials when carrying contact nerve poisons.

Insecticides and fungicides as heretofore used in the art are primarily of the character of water dispersions or emulsions. Thus some of the vegetable oils have been proposed for insecticidal purposes, and are used in the form of aqueous dispersions. For example, an emulsion of linseed oil, soap and water has thus been suggested. Such vegetable oil emulsions of the prior art have, however, not been satisfactory, because the stability of the emulsions or dispersions which were produced, and the prior art sought the production of stable emulsions or dispersions of such materials, resulted in the deposition of the oil when sprayed on plants, in the form of separate globules, in which the insecticidal agents proper were locked up, and could not, therefore, exercise widely the function sought by the use of such materials.

Among the objects of the present invention is the production of insecticides and related materials for use in the form of sprays, in which, however, the contact agent, such as the oil, is present in unstable emulsion or dispersion form, so that when sprayed on plants, the dispersion rapidly breaks down, leaving a thin film of oil dispersed over the surface of the plant carrying the insect poison to all portions thereof, and similarly spreading the oil in thin film rapidly and completely over the surface of an insect, which may be present on such plants.

Other objects of the invention include spray materials in which the toxic action is based on new principles.

Other objects of the invention include the production of such insecticide spray material which makes possible the utilization of materials not heretofore available for such purposes.

Other objects include the production of stock material for the production of such sprays, which stock material is substantially stable and unaffected by variations in temperatures, even within the limits of freezing or the high prevailing summer temperatures.

Other objects include the production of materials that are relatively cheap and inexpensive, which possess desirable toxicity, even at relatively high dilution, but exhibit an extraordinarily high margin of safety for use in larger concentrations on resistant insects without danger to plants.

Other and further objects and advantages will appear from the more detailed description given below, it being understood, however, that this more detailed description is given by way of illustration and explanation only, and not by way of limitation, since various changes therein may be made by those skilled in the art without departing from the scope and spirit of the present invention.

In accordance with this invention, a contact agent is employed for carrying the toxic material to the insects and plants, which contact agent is desirably made up as a stock material, which is dispersible in water readily to form a relatively unstable dispersion, which when sprayed upon plants and insects thereon, rapidly breaks down with the deposition of the contact material, not in the form of globules, such as have been obtained through the use of ordinary emulsifying agents, etc. in the prior art practice, but the contact agent is deposited in the form of a thin film carrying the insect poison, which is spread rapidly and completely over the surface of an insect or the plant itself. The contact agent desirably may be an ordinary vegetable or animal oil, that is, the usual type of glyceride oil.

The invention is particularly concerned with the utilization of such contact agents as a means for rapidly and completely spreading an insect poison of the surface type. It has been found that insects exhibit a number of sensitive areas widely distributed on the insect's body and its appendages. And as a result of such widely spread sensitive areas on the insect, poisons may be utilized which in contact with such sensitive areas of the insect, act as nerve poisons, which rapidly produce death of the insect in a relatively short space of time, due to such surface contact action. While this feature is particularly utilized in the present invention, as will be noted below, the principles of the invention are not limited thereto, but may also be employed in connection with other types of insect poisons, including stomach poisons, and also has application in connection with the utilization of fungicides, etc., which are all embraced within the term parasiticide as used in the claims.

In carrying out the present invention, desirably a concentrated spray material is produced, which may serve as a stock material, which may be readily and rapidly diluted in water in accordance with ordinary spraying practice, to possess the necessary bulk for practical spray operations. The stock solution is desirably produced as a substantially water-free material, whereby it is substantially stable and is not affected by variation of atmospheric temperatures, even within the limits of the freezing and high summer temperatures available in this country. In producing such stock material, a combination is produced of such substantially water-insoluble contact agents, such as a vegetable or animal oil, the desired insect poison, and an emulsifying agent.

The insect poison for most effective purposes is chosen from a group of materials that is selectively soluble in the contact agent employed. By the term "selectively soluble" as used herein, there is covered such insect poisons, which are either insoluble in the water of the final spray material, or at least are essentially carried in the contact material itself. When such contact agent, for example, is an oil, desirably the insect poison is selectively soluble in that oil contact agent, as compared with its solubility in water. In the prior art types of water dispersions and emulsions, the insect poison, such as nicotin sulphate, which was employed, was substantially soluble in water with the result that when the spray is deposited on the plant material, the insect poison being either wholly or largely soluble in the water, has a tendency to leave the contact material, such as the oil in which it may have been originally incorporated, and to move over into the water phase. When it does so, it is immediately deprived of the advantage which the contact or spreading qualities of the contact agent, such as oil, offer. Thus, for example, in the prior art use of a spray material consisting of a mineral oil emulsion to which some nicotin sulphate had been added, in the diluted spray material, the nicotin sulphate is present largely or wholly in the water, and is not able to realize its full potentialities, because it is not in permanent and selective solution in the oil. The action of the nicotin sulphate under such circumstances depends on the spreading qualities of the water, which are quite inferior.

Accordingly in accordance with the present invention, the insect poisons, and particularly the nerve poisons that are employed, are those which are selectively soluble in the contact materials, such as oil, and remain essentially therein, even in the final spray material, so that the oil which spreads as a thin film over the surface of the insect or plant carries the insect poison, particularly of the nerve poison type, rapidly and completely over the surfaces of the insect and plant, where it exhibits its maximum capability.

The stock material thus produced from the contact agent, preferably a vegetable or animal oil, and carrying an insect poison selectively soluble therein, particularly a nerve poison, also has desirably incorporated with it an emulsifying agent in order to enable the materials to be readily dispersed in water without yielding a stable emulsion or dispersion. Desirably the emulsifying agent is an oil soluble material, or is one which is soluble in the contact material employed. The admixture of such ingredients, including the contact material, the insect poison, and the emulsifying agent, produces the stock material, which being substantially free from water is not affected by freezing or other natural temperature variations. The amount of emulsifying agent employed is desirably such that the stock material when added to water is dispersed through it immediately and easily, but does not take on the form of a permanent emulsion, which is too stable. That is, in accordance with the present invention, there is taught a final dispersion of the stock material in water in such way that the water serves its necessary function of diluent and carrier to permit spraying of the diluted stock material, but at the same time the subdivision of the stock material and its suspension in water is only temporary. So that within a few minutes after the diluted material is sprayed as for example on the surface of insects, rapid breaking down of the emulsion or dispersion takes place, the water evaporates, and the oil is instantly free to flow completely over the surface carrying the toxic material with it. The oil thus quickly reaches every part of the insect, carrying the nerve poison with it, and thereby bringing about the death of the insect in a new and effective way.

As noted, the contact agent is desirably a vegetable or animal oil, among which there may be particularly mentioned corn oil, cottonseed oil, peanut oil, lard oil, fish oil, etc.

Among the insect poisons, a wide variety of materials may be included, and particularly exemplifying the nerve poisons or contact insecticides, there may be mentioned the extracts of pyrethrum flowers, and other oil-soluble extracts, such as those of derris root, cube root, or oil-soluble nerve poisons, such as the active principle of strychnia, as well as synthetic chemicals including various amine derivatives. A variety of materials may be used, and when the contact agent is an oil, the nerve poison employed should be one which can be incorporated into and retained in the oil to exert its toxic action on the sensory structures of an insect when applied to it in solution in such oil.

The emulsifying agents employed are desirably oil-soluble emulsifying agents, particularly when the contact agent is an oil. Such emulsifying agents include sulphonated castor oil, or other sulphonated vegetable or animal oils, triethylamine, diglycololeate, potassium oleo-abietate, sodium bisulphide, "Emulphor", manufactured under United States Patent No. 1,970,578 and marketed in this country by the General Dyestuff Corporation, etc. These materials render the oil or similar contact agent soluble in the water, or temporarily dispersible therein.

As exemplifying the production of a stock material, the following will serve (the parts being by volume): to 85 parts of corn oil, there is added 13 parts of a toxic agent obtained by extracting from pyrethrum flowers the active principles of such flowers, utilizing for such extraction purpose a suitable low boiling petroleum fraction. Such a low boiling fraction will effectively remove from pyrethrum flowers the pyrethrins which are the nerve poisons found in such flowers. This low-boiling fraction is in itself soluble in the vegetable oil used. To this intimate and complete solution of the toxic extractive in the vegetable oil, there is added 2 parts of a suitable oil-soluble emulsifying agent, such as a sulphonated castor oil. The resultant mixture or solution is perfectly stable under all ordinary conditions.

This stock material may then be utilized for dilution with water, and the addition of such a stock solution to water results in immediate dispersion of the stock material in the water. This dispersion prevails for a sufficient length of time to permit spraying. However, the minute droplets lodging on the surface of an insect speedily lose the surrounding film of the emulsifying agent in water, and immediately flow over the surface of the insect and coalesce, thus carrying the nerve poison to a multiple number of sensory structures of the insect. Such a dilution, for example, at the rate of 1 part of the stock material referred to above to 600 parts of water will kill substantially 100% of ordinary plant lice or aphids. Stronger concentrations may be utilized to kill more resistant insects. And the materials of the present invention exhibit a hitherto unattainable margin of safety for application on plants and leaves. While, as noted, the material is effective against many insects when used at as low a concentration as 1 gallon in 600 gallons of water, on the other hand, tests have shown that it does not harm plants when used at a concentration as great as 30 gallons in 600 gallons of water.

The example given above is illustrative and not limiting in connection with the present invention, since the various types of materials as exemplified herein, may be employed in producing effective insecticidal sprays in accordance with the present invention. The results obtained are remarkable and quite unexpected, and the combinations in accordance with the present invention exhibit properties that are not a mere summation of the properties of the separate ingredients, but the combination as produced in accordance with the present invention yields new and unforeseeable and unobvious results. A number of tests have demonstrated this to be true, of which the following may be mentioned. A spray material containing vegetable oil alone, but in the same proportions as used for example in the production of the stock material set forth above, and at similar dilution with water, was found to kill only 5% of a certain common species of plant lice or aphids. Similarly, a spray material containing the active principle of pyrethrum flowers in the same amount as that indicated for the exemplary material of the present invention, was found to kill only 10 to 15% of the aphids referred to. Further, a spray material containing the oil-soluble emulsifying agent in the proportions referred to above for the stock material, and in the indicated dilution, was found not to be toxic to such plant lice or aphids at all. So while those individual ingredients did not exhibit a satisfactory toxicity to such plant lice or aphids at all, a combination of those materials in the manner indicated for the stock material described above as illustrating the present invention, and diluted 1 to 600 as indicated, developed new and unexpected potency from the action of the ingredients, so that a practically 100% kill of those plant lice was obtained with this material. A wide number of examples exemplary of the new and unobvious results secured with the prevent invention could be given.

As noted, the invention is not limited to the specific ingredients or proportions of materials, but variations within quite wide limits, both as to proportions and ingredients is possible, so long as the principles set forth above are followed. For example, there may be incorporated in such stock material as that referred to above any one of several substances which are toxic to fungous growth, and therefore produce a spray material having desirable fungicidal action. For example, copper zeolite may be incorporated in the stock material. Sulphur may be incorporated in it. Other suitable forms of copper or sulphur compounds may be thus employed, and thereby the diluted spray gains the further advantage of fungicidal activity, acting completely and evenly over the surface of leaves or other plant structures, so as to render the fungicide more effective at a given concentration.

In addition the compositions may include substances, either in solution or suspension in the oil or other contact agent, which substances serve as a stomach poison for insects. Thus an extract of derris or of cube may be added to serve as such stomach poison. Or a finely divided or colloidal arsenic compound may be employed. Similarly a finely divided or colloidal fluorine compound may be added. Such materials being either in solution or in suspension in the oil or other contact material, are so completely and uniformly distributed over the surface of a leaf or other structure, that a leaf-eating insect cannot avoid securing a lethal dose of the poison.

The present invention, therefore, obtains what has long been sought but never adequately achieved in the art, namely a high toxicity against insects combined with extreme safety on plants, and with new and inexpensive materials.

Related compositions are described in my application Serial No. 112,463 filed November 24, 1936, as a continuation in part of this application.

Having thus set forth my invention, I claim:

1. As an insecticidal agent, a substantially non-aqueous combination of an oil selected from the class consisting of vegetable and animal oils, a contact insecticide selectively soluble in said oil, and an emulsifying agent soluble in said contact agent in proportions to give an unstable dispersion in water.

2. A substantially non-aqueous insecticidal agent readily distributable as an aqueous dispersion comprising a glyceride, a contact insecticide soluble in said glyceride and a glyceride soluble emulsifying agent in amount sufficient to form a relatively unstable dispersion when mixed with water in spraying dilutions.

3. As a parasiticidal material, the substantially non-aqueous combination comprising a glyceride oil, an oil-soluble parasiticide, and an oil-soluble emulsifying agent.

4. A substantially non-aqueous insecticidal agent readily distributable as an aqueous dispersion comprising a glyceride oil, an organic contact insecticide soluble in said oil and an oil soluble emulsifying agent in amount sufficient to form a relatively unstable dispersion when mixed with water in spraying dilutions.

5. A substantially non-aqueous insecticidal agent readily distributable as an aqueous dispersion comprising a glyceride oil, a contact insecticide comprising pyrethrins soluble in said oil and an oil soluble emulsifying agent in amount sufficient to form a relatively unstable dispersion when mixed with water in spraying dilutions.

6. A substantially non-aqueous insecticidal agent readily distributable as an aqueous dispersion comprising a glyceride oil, a contact insecticide comprising nicotine soluble in said oil and an oil soluble emulsifying agent in amount sufficient to form a relatively unstable dispersion when mixed with water in spraying dilutions.

7. An insecticidal spray comprising a glyceride, a contact insecticide soluble in said glyceride, and a glyceride soluble emulsifying agent in amount sufficient to form a relatively unstable dispersion in water, dispersed in from about 20 to 600 parts of water.

8. An insecticidal spray comprising a glyceride oil, an organic contact insecticide soluble in said oil, and an oil soluble emulsifying agent in amount sufficient to form a relatively unstable dispersion in water, dispersed in from about 20 to 600 parts of water.

9. An insecticidal spray comprising a glyceride oil, an organic contact insecticide comprising pyrethrins soluble in said oil, and an oil soluble emulsifying agent in amount sufficient to form a relatively unstable dispersion in water, dispersed in from about 20 to 600 parts of water.

10. An insecticidal spray comprising a glyceride oil, an organic contact insecticide comprising nicotine soluble in said oil, and an oil soluble emulsifying agent in amount sufficient to form a relatively unstable dispersion in water, dispersed in from about 20 to 600 parts of water.

WALTER C. O'KANE.